(12) United States Patent
Kindler et al.

(10) Patent No.: US 6,456,670 B1
(45) Date of Patent: Sep. 24, 2002

(54) METHOD FOR PROCESSING A SIGNAL CONTAINING DATA SYMBOLS

(75) Inventors: Matthias Kindler, Neubiberg; Peter Schöllhorn, Holzkirchen, both of (DE)

(73) Assignee: Infineon Technologies AG, Munich (DE)

( * ) Notice: Subject to any disclaimer, the term of this patent is extended or adjusted under 35 U.S.C. 154(b) by 24 days.

(21) Appl. No.: 09/621,907

(22) Filed: Jul. 24, 2000

Related U.S. Application Data

(63) Continuation of application No. PCT/DE99/00138, filed on Jan. 20, 1999.

(30) Foreign Application Priority Data

Jan. 22, 1998 (DE) .......................................... 198 02 398

(51) Int. Cl.⁷ .............................................. H04L 27/06
(52) U.S. Cl. ........................ 375/316; 375/326; 375/340
(58) Field of Search ................................. 375/260, 316, 375/340, 326; 370/203, 206, 210; 381/2–6

(56) References Cited

U.S. PATENT DOCUMENTS

| 5,425,050 A | * | 6/1995 | Schreiber et al. | ........... 375/130 |
| 5,682,376 A | * | 10/1997 | Hayashino et al. | ......... 370/206 |
| 5,732,068 A | * | 3/1998 | Takahashi et al. | .......... 370/206 |
| 6,137,847 A | * | 10/2000 | Stott et al. | .................. 375/344 |
| 6,205,188 B1 | * | 3/2001 | Stott et al. | .................. 375/344 |

FOREIGN PATENT DOCUMENTS

EP  0682426 A2  11/1995

OTHER PUBLICATIONS

Derwent Publication No. XP–002104225.
"COFDM: An Overview", IEEE Transactions on Broadcasting, vol. 41, No. 1, Mar. 1995, pp. 1–8.

* cited by examiner

*Primary Examiner*—Tesfaldet Bocure
(74) *Attorney, Agent, or Firm*—Laurence A. Greenberg; Werner H. Stemer; Gregory L. Maybeck

(57) ABSTRACT

A method for processing signals composed of data symbols that are each separated from one another by a guard interval. Such signals are used for digital television transmission, for example. The guard intervals results in that gaps in the flow of recovered data are produced at the reception end. These gaps are prevented by extending evaluation of the symbols to the duration of the guard interval. This allows an additional buffer store to be dispensed with.

6 Claims, 1 Drawing Sheet

METHOD FOR PROCESSING A SIGNAL CONTAINING DATA SYMBOLS

CROSS-REFERENCE TO RELATED APPLICATION

This is a continuation of copending International Application PCT/DE99/00138, filed Jan. 20, 1999, which designated the United States.

BACKGROUND OF THE INVENTION

Field of the Invention

The invention relates to a method for processing a signal which is used to transmit data in the frequency domain by use of data symbols which are separated from one another by a respective guard interval and are each composed of a particular number of carriers. Such signals are known, in particular, from digital terrestrial television transmission (i.e. digital video broadcasting).

Such multi-carrier methods can be used to transmit data distributed over a plurality of carriers. In the case of parallel transmissions, the entire frequency band of a transmission channel is split into a plurality of subchannels having a correspondingly smaller frequency band. Each subchannel is modulated with a dedicated data sequence.

A subchannel contains a carrier onto which the actual information is modulated, as in the case of conventional transmission methods. During parallel transmission, a plurality of subcarriers are therefore present. In the case of orthogonal signals, the subchannels can be isolated using correlation methods. This allows interference disturbances between the individual channels to be eliminated.

A standardized transmission method that uses parallel data and frequency multiplexing is orthogonal frequency division multiplexing (OFDM). In OFDM, each carrier is orthogonal with respect to the other carriers. In the case of digital data transmission, and hence also in the case of OFDM, the data is transmitted not as a homogeneous data stream, but rather in a particular configuration called a frame. By way of example, each frame contains 68 so-called data symbols. Each data symbol in turn contains a set of a plurality of carriers that are transmitted in parallel. The individual data symbols are separated from one another by guard intervals. These serve to minimize disturbances caused by the data symbols overlapping one another. This is necessary to obtain good separation of the subcarriers using Fourier transformation. The guard intervals are obtained by cyclical continuation of the respective signals of the subcarriers in the time domain. In this context, the guard interval makes up a fraction of the duration of the data symbol, for example a quarter. The cyclical continuation of the data symbol by the guard interval allows carrier synchronization to be maintained in the receiver. Special reference carriers disposed at defined points within a data symbol are also used for synchronization purposes. The number of these reference carriers is less than the number of data carriers, which contain the actual information.

Besides pilot carriers, parameter carriers are also part of the reference carriers. The pilot carriers are used to transmit particular data sequences whose value is known at the reception end. The pilot carriers, whose position is defined within the frame, can be used to synchronize the receiver with the received signal.

The parameter carriers transmit to the receiver the parameters used during transmission, such as the modulation scheme and the length of the guard interval.

For OFDM, the number of data items and reference carriers and also further details are defined in European Telecommunication Standards ETS 300 744 from the European Telecommunications Standards Institute, Mar. 1997.

During transmission of a signal containing data symbols separated from one another by guard intervals, time periods with the duration of the guard intervals arise in which no data carriers are received. Gaps are therefore produced in the flow of data, the size of these gaps depending on the length of the guard intervals. Since a continuous flow of data is usually required at the output of the receiver, the data is read into a buffer store. The data buffer-stored in this manner is then read out again continuously using a fixed spacing. Examples of the buffer stores used are first-in first-out (FIFO) memories. Such a buffer store makes a reception module larger and more expensive.

Summary of the Invention

It is accordingly an object of the invention to provide a method for processing a signal containing data symbols, that overcomes the above-mentioned disadvantages of the prior art methods of this general type, in which a continuous data stream is achieved at the reception end without the need for buffer storage.

With the foregoing and other objects in view there is provided, in accordance with the invention, a method for processing signals used to transmit data in a frequency domain. The method includes receiving a signal having data symbols with a symbol duration $T_U$ and guard intervals with an interval duration $T_D$ separating the data symbols from one another, each of the data symbols further having a particular number of carriers. The carriers are recovered from one of the data symbols of the signal in the frequency domain in a separator stage of a receiver. Then, at least a section of the carriers are used to determine the data transmitted with the data symbol such that the data has approximately a same time spacing over a total duration $T_S$. The total duration $T_S$ is formed of the symbol duration $T_U$ and the interval duration $T_D$.

The invention has the advantage that the carriers recovered by the separator stage do not need to be buffer-stored. A corresponding buffer store can therefore be dispensed with. In addition, further signal processing is simplified, because the carriers to be processed are present in a continuous train.

Evaluation can take place at a lower speed since the carriers transmitted over the transmission duration of a data symbol have at their disposal the transmission duration for the data symbol together with a guard interval. The invention is therefore advantageously used in conjunction with further methods for signal processing.

Signal processing includes, in particular, the detection of reference carriers, the detection of interference and channel estimation, which is used for the arithmetical correction of the transfer functions of the channel. In this context, differences between an actual transmission channel and a standard channel defined in terms of its transmission properties are determined. The transfer function is estimated by interpolation using a plurality of reference carriers.

In order to be able to carry out estimations at a particular instant, reference carriers are required which are not received until a later instant, that is to say are not yet available at the particular instant. This problem is solved by moving the estimation for the earlier instant to the later instant. The channel estimation for a particular instant is therefore delayed. The reference carrier information already available at the earlier instant needs to be stored on account of the delayed estimation.

The estimated transfer function of the channel is used to correct the data carriers. The phase and amplitude of the data carriers are altered such that they match the phase and amplitude of a corresponding data carrier that has been transmitted over the standard transmission channel.

Signal processing also includes detection of interference that may arise, for example, when analog signals are transmitted over the same channel.

Expediently, only those carriers in a data symbol that need to be used for signal processing are stored.

In accordance with an added feature of the invention, the section of the carriers is supplied to a signal processing stage using buffer-stored carriers.

In accordance with an additional feature of the invention, channel estimation is carried out in the signal processing stage.

In accordance with another feature of the invention, a function of the carriers is buffer-stored in different groups, with the carriers which were read into a respective group during an earlier storage operation being overwritten.

In accordance with a further added feature of the invention, there is the step of storing only the carriers needed for synchronization during synchronization of the receiver with the signal.

In accordance with a concomitant feature of the invention, the data are determined using a digital timing oscillator.

Other features which are considered as characteristic for the invention are set forth in the appended claims.

Although the invention is illustrated and described herein as embodied in a method for processing a signal containing data symbols, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 3:
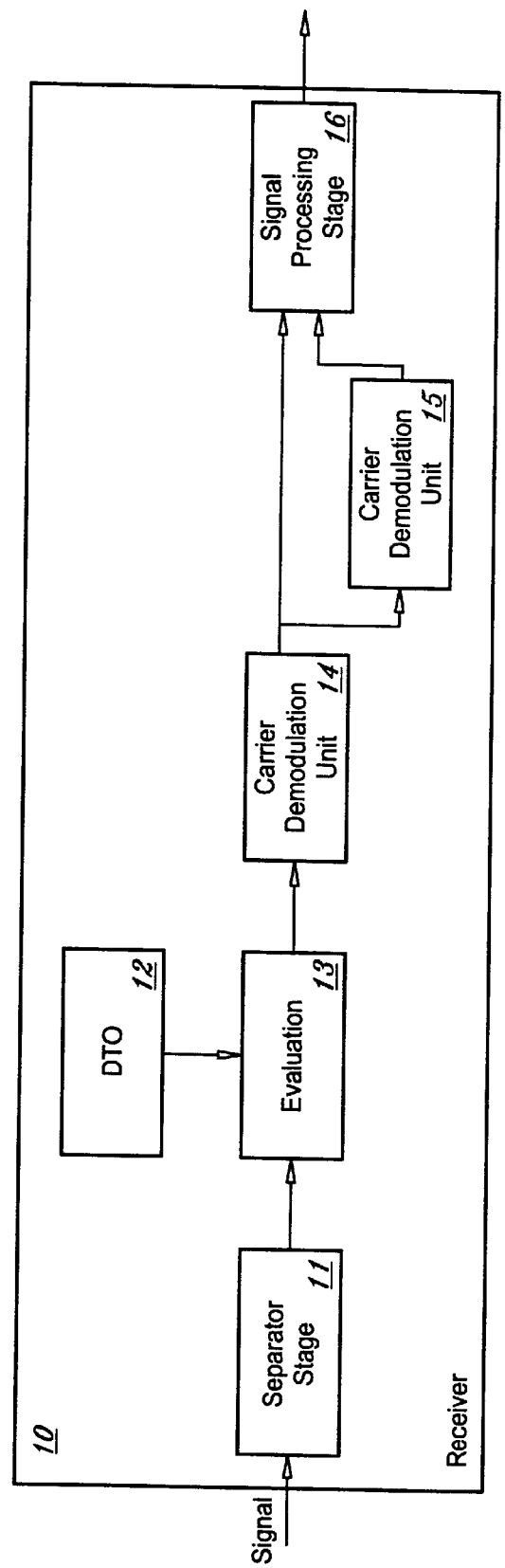
FIG. 3 is a block diagram of a receiver.

In all the FIGS. of the drawing, sub-features and integral parts that correspond to one another bear the same reference symbol in each case. Referring now to the FIGS. of the drawing in detail and first, particularly, to FIG. 1 thereof, there is shown a signal SIG that is to be transmitted and is composed of data symbols separated from one another by guard intervals. The signal SIG is transmitted to a receiver 10 (see FIG. 3) for example. In this context, let a data symbol duration be $T_{Ui}$, and an interval duration, that is to say a duration of a guard interval (SI), be $T_{Di}$. Accordingly, a total duration $T_S$ for transmitting a data symbol and the associated guard interval (SI) is $T_S = T_{Ui} + T_{Di}$.

The signal SIG is picked up by the receiver 10 and transformed into the frequency domain, as a result of which individual carriers C in the data symbol are recovered. For transformation purposes, Fourier transformation is particularly suitable, for which (for the purposes of discrete evaluation) algorithms are known which can easily be carried out by a signal processor. An example of such an algorithm is a Fast Fourier Transformation (FFT).

The data symbols recovered at the reception end have the spacing, prescribed by the guard intervals, of the interval duration $T_{Di}$. The individual data items modulated onto the carriers C in the data symbols can be removed from the carriers C by demodulating the individual carriers C. The individual data items are then available in packets that likewise have the spacing governed by the guard intervals.

The invention therefore proposes that, once the signal has been transformed into the frequency domain, the further evaluation of the individual carriers C should be controlled such that its performance is approximately evenly distributed over the total duration $T_S$. To evaluate the carriers C in a starting data symbol ADS, the guard interval (SI) between the starting data symbol ADS and a subsequent succeeding data symbol NDS is also used. Evaluation of the carriers C in the starting data symbol ADS need not be completed until the start of the succeeding data symbol NDS.

Figure 1:
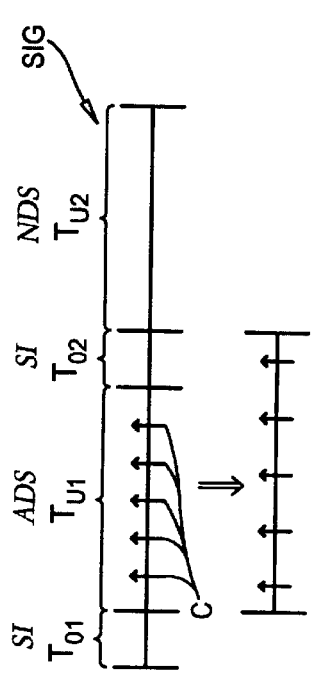
FIG. 1 is an illustration showing a duration for a transmission and an evaluation of carriers in a data symbol according to the invention.

The top row of FIG. 1 shows the data symbol duration $T_{U1}$ and the interval duration $T_{D2}$ between the starting data symbol ADS and the succeeding data symbol NDS. The vertical arrows in the illustration of the starting data symbol ADS represent the carriers C in the starting data symbol ADS. In particular, the illustration of the carriers C is merely schematic. According to the ETS standard for OFDM, they are 6,817 or 1,705 in number, depending on the selected mode.

At an output of a separator stage 11, in which, by way of example, the transformation is carried out or the carriers C in the data symbols are recovered in another way, for example by filtering, the data symbols are produced with the time spacing of the interval duration $T_{D1}$. The further evaluation of the carriers C in the data symbols is controlled by an adjustable counting apparatus. The adjustable counting apparatus used can be a digital timing oscillator (DTO) 12. During a synchronization phase, which is shorter than the interval duration $T_{Di}$, the adjustable counting apparatus receives the parameters that were used during transmission of the signal SIG. These parameters include the number of carriers C transmitted with a data symbol and the interval duration $T_{Di}$. The number of carriers C in a data symbol can be used to infer the data symbol duration $T_{Ui}$. A quotient of the total duration $T_S$ which is then known and the number of carriers C in the data symbol which are to be evaluated then gives the time in which evaluation of an individual carrier C needs to be carried out. Evaluation of all the carriers C in the data symbol is not necessary in every case.

The second row shown in FIG. 1 shows a timing pattern for the evaluation of the carriers C in the starting data symbol ADS. Even when the carriers C shown are continued in the second row of FIG. 1 with the appropriate carriers C in the succeeding data symbol NDS, there is an approximately constant spacing between the individual carriers. The timing pattern is used to supply the carriers C preferably to a carrier demodulation unit 14. The individual data items modulated onto the carriers C are recovered by demodulation in the carrier demodulation unit 14. The carriers C may also first be supplied to a further signal processing stage, and then to the carrier demodulation unit.

Figure 2:
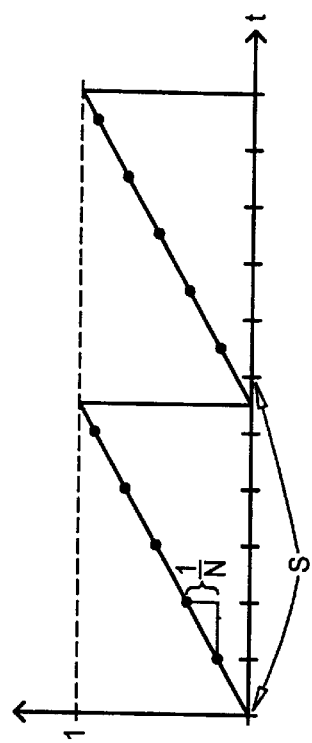
FIG. 2 is a timing diagram to explain the way in which a controllable counting apparatus works.

The timing diagram in FIG. 2 is used to explain how the evaluation operation is controlled by the adjustable counting apparatus. The separator stage 11 usually operates at a system clock rate r prescribed by a processor. Input signals supplied to the separator stage 11 are processed in time with a system clock rate r. The time available for evaluating the carrier C is not always an integer multiple of the reciprocal system clock rate r, that is to say of the time taken up by one clock pulse. The number of clock pulses N necessary for evaluating the carrier C is first calculated from:

$$N = \frac{T_s}{n} \cdot r.$$

The actual number of clock pulses $N_I$, is obtained by rounding up N to the next largest integer. The counting apparatus then calculates the number of clock pulses N, which may be a fractional rational number. Starting at 0, the value 1/N is added with each system clock pulse. If the sum exceeds the value 1, the counting apparatus starts the counting operation from the beginning at 0. At the same time, evaluation of the next carrier C is initiated. This procedure results in the calculated number of clock pulses N being rounded to the actual number of clock pulses $N_I$.

FIG. 2 shows that a different number of actual clock pulses $N_I$ may arise when two successive carriers are evaluated. The points plotted in FIG. 2 identify the system clock r. Carrier evaluation is initiated at each of the instants marked S.

For the rest of the signal processing, for example the channel estimation, it may be necessary to access both the carriers C in the present data symbol and also those in the past data symbol. The carriers C required after evaluation for later processing are stored in a common memory block 15 having a particular memory capacity.

The function of the carriers C is buffer-stored in the memory block 15 in different groups. As the carriers C in the respective group are read in, the carriers C with the respective oldest value in the respective group are overwritten. This allows the required carriers C to be buffer-stored with little memory capacity being involved. The separator stage 11 delivers the carriers C in the present data symbol. Depending on the type of carrier C, the values required for further processing are read from the memory block 15, in addition to the present carrier, and are supplied to an appropriate signal processing unit or stage 16. The present carriers are then likewise written-to the memory block. The carriers C of the appropriate carrier type that have the oldest value are overwritten in the process.

During the synchronization phase, the memory block can be used. for storing interim results that need to be buffer-stored for synchronization.

We claim:

1. A method for processing signals used to transmit data in a frequency domain, which comprises the steps of:

receiving a signal having data symbols with a symbol duration $T_U$ and guard intervals with an interval duration $T_D$ separating the data symbols from one another, each of the data symbols further having a particular number of carriers;

recovering the carriers in one of the data symbols of the signal in the frequency domain in a separator stage of a receiver; and using at least a section of the carriers to determine the data transmitted with the data symbol such that the data has approximately a same time spacing over a total duration $T_S$, the total duration $T_S$ formed of the symbol duration Tu and the interval duration $T_D$.

2. The method for processing the signal according to claim 1, which comprises supplying the section of the carriers to a signal processing stage using buffer-stored carriers.

3. The method for processing the signal according to claim 2, which comprises carrying out channel estimation in the signal processing stage.

4. The method for processing the signal according to claim 1, which comprises buffer-storing a function of the carriers in different groups, with the carriers which were read into a respective group during an earlier storage operation being overwritten.

5. The method for processing the signal according to claim 1, which comprises storing only the carriers needed for synchronization during synchronization of the receiver with the signal.

6. The method for processing the signal according to claim 1, which comprises determining the data using a digital timing oscillator.

* * * * *